(12) United States Patent
Winshtein et al.

(10) Patent No.: US 9,539,876 B2
(45) Date of Patent: Jan. 10, 2017

(54) WHEEL WITH SUSPENSION SYSTEM AND CENTRALIZING UNIT WITH SUSPENSION SYSTEM

(71) Applicant: SoftWheel Ltd., Tel-Aviv (IL)

(72) Inventors: Ronny Winshtein, Ramat-HaSharon (IL); Amichay Haim Gross, Herzlia (IL); Dvir Brand, Hod-HaSharon (IL); Ahishay Sardes, Tel-Aviv (IL)

(73) Assignee: SOFTWHEEL LTD, Tel-Aviv (IL)

( * ) Notice: Subject to any disclaimer, the term of this patent is extended or adjusted under 35 U.S.C. 154(b) by 0 days.

(21) Appl. No.: 14/354,607

(22) PCT Filed: Oct. 8, 2012

(86) PCT No.: PCT/IB2012/001994
§ 371 (c)(1),
(2) Date: Apr. 28, 2014

(87) PCT Pub. No.: WO2013/061121
PCT Pub. Date: May 2, 2013

(65) Prior Publication Data
US 2014/0300037 A1    Oct. 9, 2014

Related U.S. Application Data

(63) Continuation-in-part of application No. PCT/IB2012/000530, filed on Mar. 20, 2012.
(Continued)

(51) Int. Cl.
*F16F 9/14* (2006.01)
*B60G 15/12* (2006.01)
(Continued)

(52) U.S. Cl.
CPC ............. *B60G 15/12* (2013.01); *B60B 9/06* (2013.01); *B60B 9/24* (2013.01); *F16F 1/128* (2013.01);
(Continued)

(58) Field of Classification Search
CPC ...................................... B60B 9/28; B60B 9/26
(Continued)

(56) References Cited

U.S. PATENT DOCUMENTS 1,132,787 A  *  3/1915  Mansfield ................ 152/95
1,133,973 A  *  3/1915  Koch ...................... 152/93
(Continued)

FOREIGN PATENT DOCUMENTS

DE    102005032537    1/2007
FR         1105719     12/1955
(Continued)

OTHER PUBLICATIONS

International Preliminary Report on Patentability Dated May 8, 2014 From the International Bureau of WIPO Re. Application No. PCT/IB2012/001994.
(Continued)

*Primary Examiner* — Robert A Siconolfi
*Assistant Examiner* — Mahbubur Rashid
(74) *Attorney, Agent, or Firm* — Clements Bernard PLLC; Christopher L. Bernard; Lawrence A. Baratta, Jr.

(57) ABSTRACT

A wheel with a suspension system being connectable to a vehicle, like a wheel chair, comprises a hub (38) and a rim (34) rotatable about the axle (42) of the hub (38). Between the hub (38) and the rim (34), a number of support members (40) is located. The support members (40) are adapted to retain the distance when stressed up to a threshold value and recovery alter the distanced when stressed over this threshold value. According to the invention, the support members (Continued)

(40) are comprising spring elements (50), damping strokes by compression if the support member (40) is compressed or elongated. The spring elements (50) are preferably preloaded.

18 Claims, 4 Drawing Sheets

Related U.S. Application Data

(60) Provisional application No. 61/552,505, filed on Oct. 28, 2011, provisional application No. 61/485,086, filed on May 11, 2011, provisional application No. 61/552,505, filed on Oct. 28, 2011.

(51) Int. Cl.
| | | |
|---|---|---|
| *B60B 9/06* | (2006.01) | |
| *B60B 9/24* | (2006.01) | |
| *F16F 1/12* | (2006.01) | |
| *F16F 9/02* | (2006.01) | |
| *A61G 5/10* | (2006.01) | |

(52) U.S. Cl.
CPC ..... *F16F 9/0245* (2013.01); *A61G 2005/1078* (2013.01); *B60B 2900/131* (2013.01); *B60G 2204/30* (2013.01); *B60G 2300/24* (2013.01); *B60Y 2200/84* (2013.01)

(58) Field of Classification Search
USPC ......... 267/64.15, 64.18, 64.22, 64.25, 64.26; 188/314, 380, 322.19
See application file for complete search history.

(56) References Cited

U.S. PATENT DOCUMENTS

| | | | |
|---|---|---|---|
| 1,189,963 A * | 7/1916 | Jones | F16F 1/128 16/72 |
| 1,416,078 A * | 5/1922 | Taylor | 152/98 |
| 1,495,699 A * | 5/1924 | Kunoki | 152/87 |
| 2,639,140 A * | 5/1953 | Frenkel | F16F 1/128 267/140.2 |
| 4,310,149 A | 1/1982 | Camilleri | |
| 4,903,792 A * | 2/1990 | Ze-ying | F01B 13/061 180/308 |

FOREIGN PATENT DOCUMENTS

| | | | |
|---|---|---|---|
| FR | 2795947 | | 1/2001 |
| FR | 2898077 | | 9/2007 |
| GB | 191217140 a | * | 0/1913 |
| GB | 1549611 | | 8/1979 |
| GB | 2188596 | | 10/1987 |
| WO | WO 2006/128291 | | 12/2006 |
| WO | WO 2012/153170 | | 11/2012 |
| WO | WO 2013/061121 | | 5/2013 |

OTHER PUBLICATIONS

International Preliminary Report on Patentability Dated Nov. 21, 2013 From the International Bureau of WIPO Re. Application No. PCT/IB2012/000530.
International Search Report and the Written Opinion Dated Aug. 1, 2012 From the International Searching Authority Re. Application No. PCT/IB2012/000530.
International Search Report Dated Jan. 24, 2013 From the International Searching Authority Re. Application No. PCT/IB2012/001994.

* cited by examiner

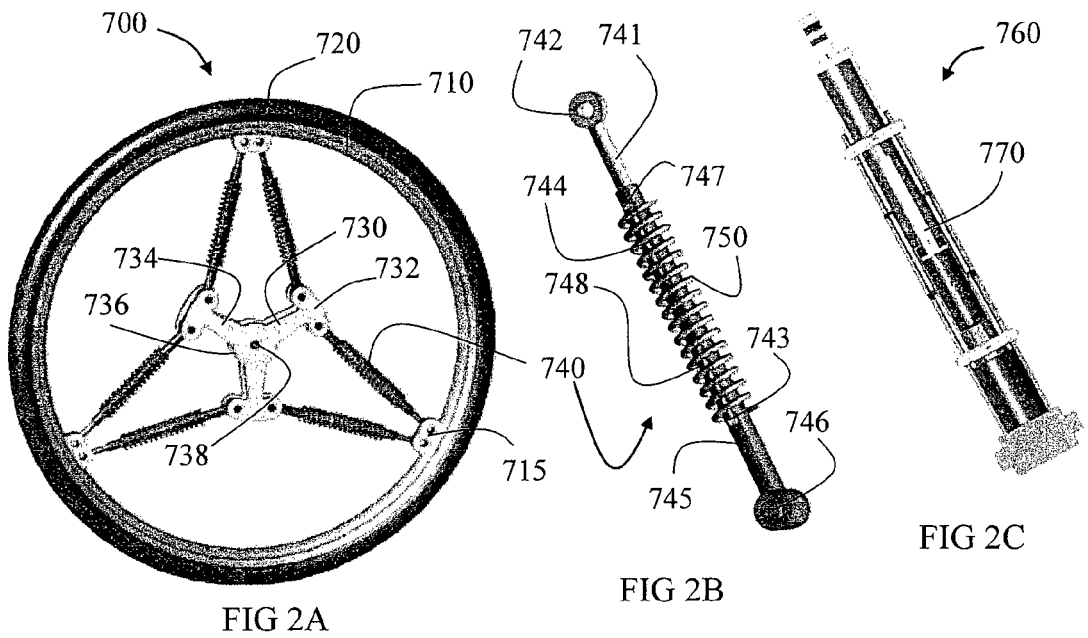
FIG 2A
FIG 2B
FIG 2C
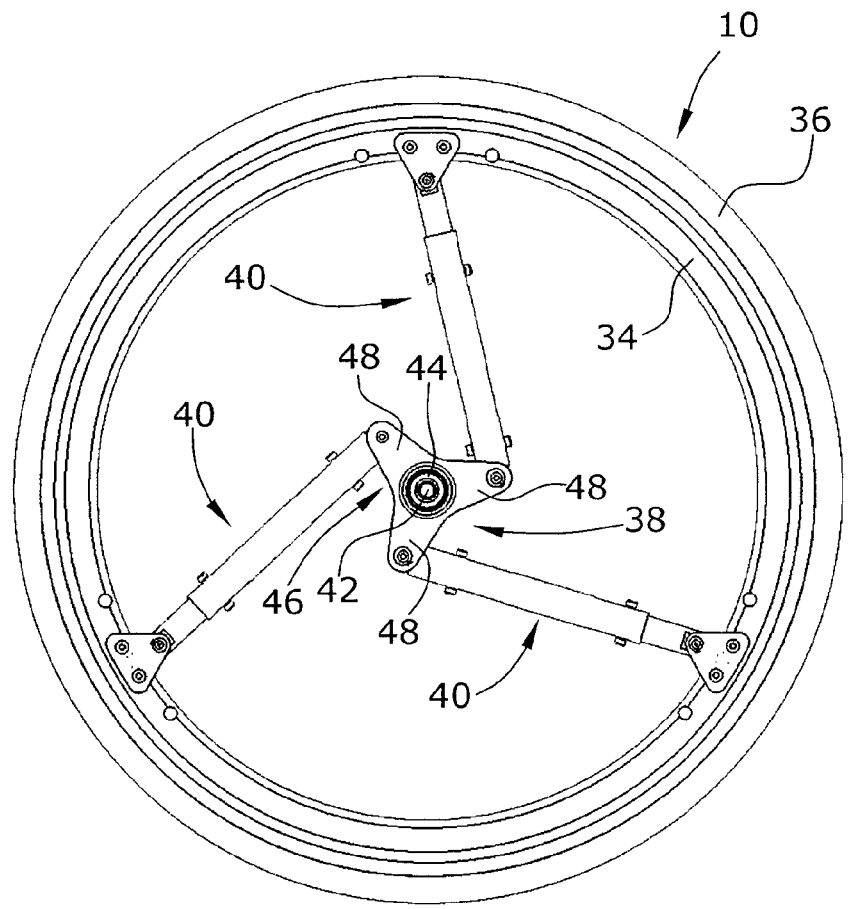
Fig.3

WHEEL WITH SUSPENSION SYSTEM AND CENTRALIZING UNIT WITH SUSPENSION SYSTEM

RELATED APPLICATIONS

This application is a National Phase of PCT Patent Application No. PCT/IB2012/001994 having International filing date of Oct. 8, 2012, which is a Continuation-in-Part (CIP) of PCT Patent Application No. PCT/IB2012/000530 having International filing date of Mar. 20, 2012, which claims the benefit of priority under 35 USC §119(e) of U.S. Provisional Patent Application No. 61/552,505 filed on Oct. 28, 2011 and 61/485,086 filed on May 11, 2011.

PCT Patent Application No. PCT/IB2012/001994 also claims the benefit of priority under 35 USC §119(e) of U.S. Provisional Patent Application No. 61/552,505 filed on Oct. 28, 2011.

The contents of the above applications are all incorporated by reference as if fully set forth herein in their entirety.

FIELD AND BACKGROUND OF THE INVENTION

The present invention refers to a wheel with a suspension system. Such wheels can particularly be used in self-propelled vehicles, like wheel chairs and bicycles. Furthermore, these wheels can also be used for suspension of any rotatable mass including wheels of motorized or otherwise powered vehicles. Furthermore, the present invention refers to a centralizing unit comprising a suspension system, whereby this centralizing unit may, according to the invention, be part of a wheel.

Rotating masses tend to accommodate vibrations and shocks due to internal and/or external forces and impacts from surfaces in contact. One example is the vibratory motion of a wheel when it travels a distance on a non-purely smooth surface. Motorized and other vehicles commonly include cumbersome suspension systems in order to protect their chassis or other affiliated parts from early failure as well as to avoid unpleasant conditions to passengers.

Suspension systems, mostly including springs and spring elements, are commonly connected to static parts of the machine or vehicle, on one end, and in direct contact with the axle or other elements that provide a stable axis of rotation to the rotating mass or rotator. For example, a wheel that travels over a rough surface will transfer axial, vertical and other forces (e.g., impacts and/or vibratory) to the axle, which will be partially absorbed and diminished using suspension means that can be located between the axel and the chassis. Several attempts are known for implementing suspension mechanisms inside the wheels.

In recent years there is a growing trend towards more efficient self-propelled vehicles where the invested human power is transferred to movement of the vehicle with minimal energy loss. Modern wheelchairs and bicycles incorporate lightweight structural parts, wheels structures with improved strength-weight ratio, tires designed for minimized resistance to rolling, etc. There is also a preference of most riders to feel a rigid or responsive ride, rather than a soft one, especially when driving over substantially smooth surfaces and/or when riding upward inclines, and also when accelerating, decelerating or maneuvering. When suspension is implemented the manufacturers usually make some accepted tradeoffs between the physiological and improved comfort needs with the dynamic preferences of the users.

From GB 2 188 596, it is known to provide a wheel of a wheel chair with resilient spokes. These spokes are located non-radial so that the spokes can be flexed due to an impact. This wheel has the possible drawback that due to the high stress of the spokes, the spokes may break.

Another wheel having an implemented suspension mechanism inside the wheel is known from DE 10 2005 032 537. This car wheel has radial located spokes that are comprising an hydraulic damper. The possible drawback of the use of such dampers is that the damping characteristics by compressing the damper differ from the damping characteristics by elongating the damper. Since the wheel has a number of regularly located dampers, a damper being located opposite to the damper being compressed, has to be elongated. Due to the different damping characteristics, the rotation of the wheel becomes uneven. Furthermore, the dampers described in DE 10 2005 032 537 cannot be preloaded.

SUMMARY OF THE INVENTION

Therefore, it is one object of the invention to provide a wheel, particularly a wheel for self-propelled vehicle such as a wheel chair or a bicycle, having a smooth and even damping system.

This and other objects are solved by a wheel according to claim 1. And by a centralizing unit according to claim 26.

The present disclosure can be related or implemented in any rotatable mass including wheels having a hub in concentric relation with a rim, when in nominal state.

A wheel according to the invention is connected or connectable to a vehicle, particularly to a self-propelled vehicle, a wheel chair or the like, or to other vehicles like cars, motorbikes etc. The wheel has a hub comprising an axle or being connectable to an axle. This hub may comprise a bearing, whereby particularly an inner ring of the bearing can be connected to the axle. Furthermore, the wheel comprises a rim being rotatable around the axle. The rim may particularly comprise a wheel rim, a tire, a hub, a bearing outer ring etc. Between the hub and the rim, at least one, particularly a plurality of support members, are located. The support members are normally providing a fixed distance between the station member and the rim. According to the invention, the support member is adapted to retain this distance when stressed up to a threshold value and to recoverably alter this distance when stressed over this threshold value. According to embodiments of the invention, this function of the support member is derived by a spring member, being part of the support member or building the support member. The spring member stores mechanical energy at compression, and in a preferred exemplary embodiment, the spring member is preloaded to a predetermined threshold value, thereby compresses only to compressive forces greater than the threshold value. In some embodiments, the spring member includes or is coupled or otherwise functionally linked to a damper, that is effectively operable (e. g., absorbs or dissipates kinetic energy) only during spring member change of size, or optionally only during its compression. In some embodiments, the spring member is in both ways compressed by the stroke, if the support member compresses and if it elongates. By compressing the spring member independent of compressing or elongating the support member, an identical dampening characteristic is optionally given. Therefore, the present invention has the advantage that particularly a wheel having a number of support members being located between the hub and the rim, can be smoothly damped, preferably only at strokes or shocks in a magnitude above a predetermined threshold value. Within a preferred embodiment of the invention, the supporting member comprises two longitudinal elements being slidably connected to each other. The two longitudinal elements are optionally comprising two cylinders, or a cylinder and a rod, one located inside the other. The spring element and/or damper can be located in and/or between the two longitudinal elements so that a relative movement of the longitudinal elements to each other causes the spring element and/or damper to be compressed.

In some embodiments, both end portions of the spring element and/or damper are connected to one of the two longitudinal elements, whereby optionally, both end portions of the spring element are connected to the inner longitudinal element. In this preferred embodiment, the spring element surrounds the outer longitudinal element. In another preferred embodiment the connection is the other way around so that both end portions of the spring element are connected to the outer longitudinal element, whereby the spring element is preferably located inside the inner longitudinal element.

In some such optional embodiments, fixing elements are connected to the end portions of the spring element and the inner or the outer longitudinal element. These tracked sliding elements are preferably passing through longitudinal slits, which are preferably located in both longitudinal elements. The outer ends of these longitudinal slits being directed in the damping or moving direction of the damper are the stoppers of the damper. If the damper is preferably preloaded, both tracked sliding elements are pressed against the outer ends of the longitudinal slits due to the force of the damper caused by preloading. The tracked sliding elements are connecting the spring element to the inner or the outer longitudinal element and having preferably a pin-like shape.

The spring element may include a spring, optionally a coil compression spring or a piston spring, pneumatic or hydraulic. In case of a piston type spring, the spring element may include damping function as well, for example if a piston member thereof is provided with at least one minute opening allowing travel of flowable medium passing therethrough during strokes, in a way that transforms kinetic energy to heat by fluid friction. A damper may be provided as a separate member, optionally hydraulic cylinder type (e.g., "dashpot"), liner or rotary, or a mechanical damper operating on dry friction between solid components, an hysteresis type damper (e.g., metal or polymeric compression structures).

Furthermore, the plurality of supporting members is optionally connected to the hub in a non-radial manner. Therefore, a compression force caused by an impact to a lower located supporting member of a wheel will not be transferred directly to the axle of the wheel, but at least partly guided surround the axle of the wheel causing an elongation of a support member being located in an upper position. Such a non-radial configuration has several advantages, including increased stroke length of the support member and inner spring element and/or damper and increase in overall stability and/or strength of the entire construction. Furthermore, when the hub shifts away from concentricity with respect to the rim and the suspension is activated, the non-radial configuration of the interconnecting supporting members causes the hub also to rotate about its axis with respect to the rim, so that particularly a piston type spring element and/or damper will avoid potential "sticking" phenomena, for example if the altering force is orthogonal thereto at the stroke initiation.

Therefore, in embodiments, the hub comprises particularly radially arranged arms, whereby the supporting members are connected to the outer end portions of these arms.

Optionally, the supporting members are pivotably connected to the hub and/or the rotatable member of the wheel.

In one embodiment, the supporting members are arranged symmetrically around the hub so that the distance of neighbored supporting members are equal.

In another embodiment, two supporting members are building a pair of supporting members, whereby it is preferred that a plurality of pairs of supporting members is arranged, whereby the pairs are symmetrically located around the hub. In this embodiment, it is preferred that the end portion of the arms of the hub has two protrusions, whereby a supporting member is connected to each one of the protrusions. Two supporting members being connected with end portions of different arms form a pair of supporting members. The two supporting members of this pair of supporting members are located symmetrically to a radial line between the axle of the hub and the rim.

In some embodiments of the invention, the vehicle is a self-propelled vehicle, for example a wheelchair or a bicycle. In some embodiments, the wheel is a rear wheel in a wheelchair. In some other embodiments, the wheel includes a caster which is fixedly rotatable about at least two axes projecting from the vehicle. In some embodiments of the invention, the hub includes at least one of: an axle, a caster housing, and a bearing inner ring. In some embodiments, the rim includes at least one of: a tire, a wheel rim, a hub shell, a fork, and a bearing outer ring.

In some embodiments of the invention, the threshold value relates to a minimal shock magnitude absorbed by the wheel. Alternatively or additionally, the threshold value relates to a minimal vibration amplitude absorbed by the wheel. Alternatively or additionally, the threshold value reciprocally relates to a maximal vibration amplitude absorbed by the wheel. Alternatively or additionally, the threshold value reciprocally relates to a maximal vibration frequency absorbed by the wheel.

Furthermore, in an aspect of some other embodiments, the invention refers to a centralizing unit optionally comprising a suspension system. The suspension system comprises at least one support member. This support member has an outer longitudinal element and inner longitudinal element as described above in view of a preferred embodiment of the wheel. Particularly, the outer longitudinal element includes a lumen and comprises two slots, a top outer slot and a bottom outer slot. Additionally, the inner longitudinal element being slidable in the lumen of the out longitudinal element, comprises also two slots, a top inner slot and a bottom inner slot. A sliding pin is located in each of the two top slots and the two bottom slots. Between the two sliding pins, a spring element is located being connected to both pins. The slots are sized and arranged so that the central relative position between the two longitudinal elements the top pin and the bottom pin are pushed by a spring to a maximal distance. At any non-central relative position between the longitudinal elements, the pins are forced to approach each other to a distance smaller than the maximal distance, thereby compressing the spring located between the two pins.

The spring element is preferably preloaded so that the nominal length is smaller than a non-stressed length of the spring.

In a preferred embodiment of the centralizing unit disclosure, the centralizing unit comprises a central member connected at a first portion thereof to a first support member and at an evenly displaced second portion thereof to a second support member. Preferably, a third support member is connected to the central member, whereby the number of support members is evenly displaced. The support members are preferably identical. Loading a central member having two support members will cause one support member to elongate and the other support member to compress, whereby both spring elements of the two support members are compressed so that a cumulative compression force thereof resists the loading. The same principle that the spring elements are compressed even if the support member is elongated, occurs if a larger number of support members is particularly symmetrically located around a central member.

BRIEF DESCRIPTION OF THE DRAWINGS

Hereinafter, preferred embodiments of the invention are described, referring to the drawings.

FIGS. 2A-C illustrate an exemplary wheel comprising a plurality of spoke type selective suspension members in accordance with a first preferred embodiment of the invention, FIG. 3 illustrates a perspective view of a second embodiment of the invention.

DESCRIPTION OF SPECIFIC EMBODIMENTS OF THE INVENTION

The following preferred embodiments may be described in the context of exemplary suspension mechanisms for wheelchairs, or other types of self-propelled vehicles, for ease of description and understanding. However, the invention is not limited to the specifically described devices, and may be adapted to various applications without departing from the overall scope of the invention. For example, devices including concepts described herein may be used for suspension of any rotatable mass including wheels of motorized or otherwise powered vehicles.

Common suspension systems are built to absorb interruptions and obstacles which cause deceleration and/or undesired vibration to the vehicle and/or aid the wheel in following the terrain and avoiding loss of contact with it, or grip. In doing so, the suspension systems are built to absorb and/or dissipate energy, including such that can be translated to effective kinetic energy. Furthermore, the common suspension systems (which include, for example, parts like metal springs, cushioning materials and elastomers) cause a feeling of plushness, or softness, which may cause a sense of instability, which are undesirable by many users.

In order to answer these and other considerations, the present invention provides or includes means for selective responsiveness (or irresponsiveness) according to types and/or magnitudes of absorbed interferences or perturbations.

Figure 1A:
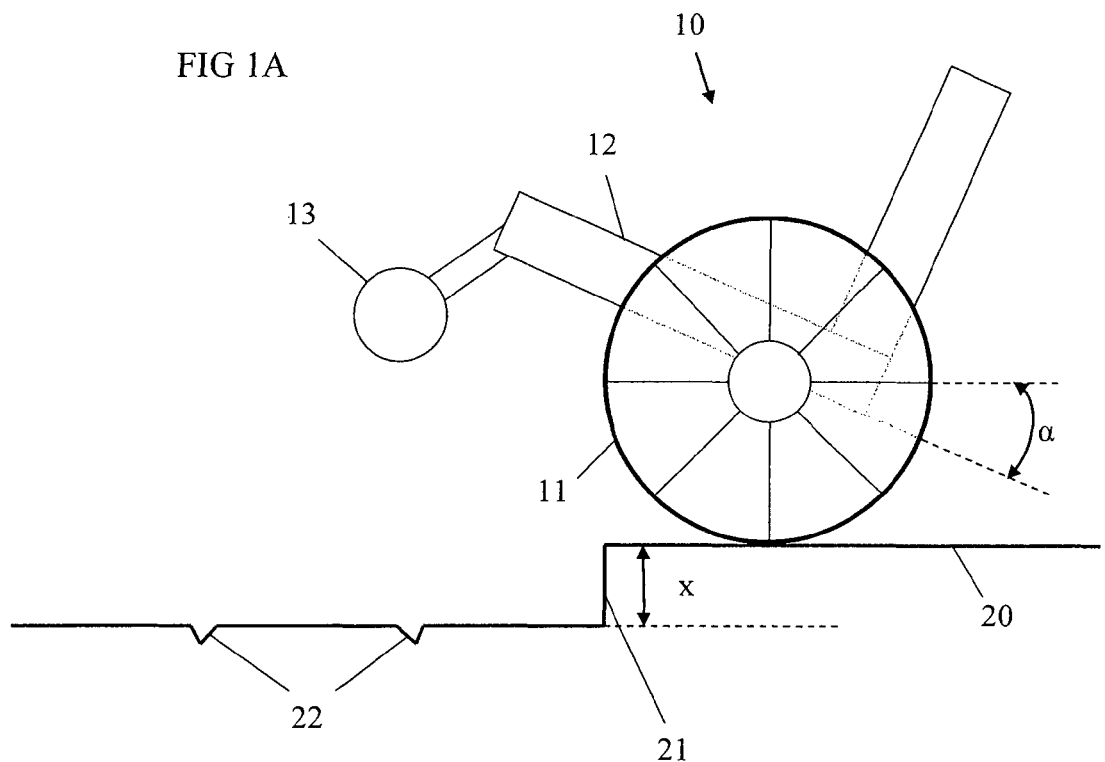
FIGS. 1A-B schematically illustrate side views of a wheelchair and a wheel anticipating different obstacles during motion, in accordance with embodiments of the present invention.
Figure 1B:
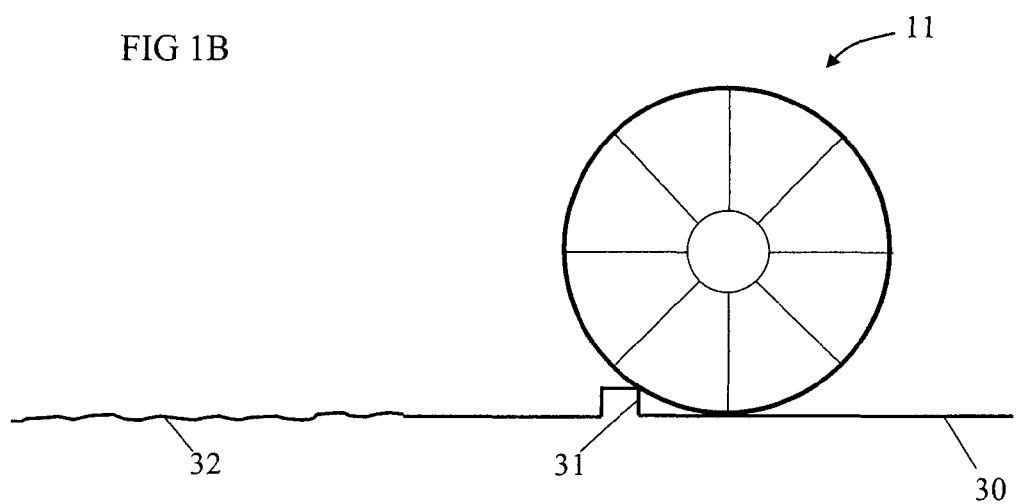

Referring now to the drawings, FIGS. 1A-B schematically illustrate side views of a wheelchair 10 and a rear wheel 11 anticipating different obstacles during motion, in accordance with embodiments of the present invention. Besides combining two rear wheels such as wheel 11, wheelchair 10 further includes a seat 12 and a pair of casters 13. In FIG. 1A, wheelchair 10 moves along path 20 which includes a step or a curb descent 21 with height x, as well as a plurality of recesses 22, such as tile gaps or chamfers on paved surfaces. Height x may be about 10 cm or more in case of a sidewalk curb, or 15 cm or more in case of a standard stairway step. Recesses 22, on the other hand, are of heights of less than 3 cm, usually around 1 cm. In some embodiments, the suspension system of the present invention includes means for selective differentiation between drops from different heights, for example drops from up to 1 cm, optionally up to 3 cm and those which are equal or higher than 1 cm, optionally 3 cm, optionally 5 cm, or higher, or lower or intermediate. Also, a selective differentiation may be applicable for a range of drops or perturbations, such as over 3 cm and under 10 cm, for example.

Wheelchair 10 is shown in motion adjacent a forward-facing step 21 with its front end is tilted upwardly (commonly known as performing a "wheelie"), pivoting around rear wheel(s) 11—a common practice when riding over steps, performed either by an attendant or by the wheelchair user himself. The tilting angle α may be between 0 to 40°, and optionally higher. Such tilting maneuver changes the impact angle of the wheelchair with the ground and should be considered when designing an effective suspension mechanism. In some embodiments, the suspension system of the present invention is configured for effective suspension of falls at different impact angles, optionally in angles range of at least −10° to 10°, optionally −30° to 30°, optionally −60° to 60°. Also, in some cases the drop can be taken in reverse, meaning that the rear wheels go first, while the front casters are still on the top platform, generating a mild "nose up" angle of generally less than 20°, but optionally higher.

FIG. 1B shows a second demonstrative scenario in which wheel 11 (shown independently for ease of demonstration only) travels along path 30 that includes a bump 31 of a significant height followed by a substantially shallow coarse road 32. In some embodiments, the suspension system of the present invention includes means for selectively differentiating between bumps of different heights, and for example may allow suspension of bumps of 0.5 cm or higher, optionally 1 cm or higher, optionally 3 cm or higher. Alternatively or additionally, such or other means may allow suspension of bumps shorter in height than wheel radius, optionally shorter than ¾ its radius, optionally shorter than ½ its radius. Alternatively or additionally, such or other means may differentiate between road types (such as between coarse roads like road 32) which cause vehicle's and/or wheel's vibrations differentiated by acceleration impact amplitude and/or frequency, optionally depending also on vehicle's velocity. In some such embodiments, the suspension selectivity is also based on a defined allowed load (e.g., combined weight of wheelchair and user) or on a defined allowed range of loads, so that only if such a condition is met, the suspension system can correctly differentiate between such predetermined fall heights. For example, a suspension system according to the present disclosure can be provided in two rear wheels of a wheelchair, and provided and preset such, that if a combined weight of the wheelchair and a wheelchair user is, for example, between 40 Kg to 120 Kg, or optionally between 50 Kg to 100 Kg, or optionally between 60 Kg to 80 Kg, or optionally about 70 Kg, or higher or lower or an intermediate value, then the suspension system will not operate at shocks originating from falls of 40 mm or less, optionally 20 mm or less, optionally 10 mm or less, optionally 5 mm or less, optionally 2.5 mm or less, in height, or higher or lower or an intermediate value.

Reference is now made to FIGS. 2A-C which illustrate an exemplary wheel 700 comprising a plurality of spokes type selective suspension members 740 (or 760), with a first embodiment of the present invention. Wheel 700 includes a rim 710 wearing a tire 720, a hub 730 and the plurality of members 740 that are symmetrically and evenly distributed and connecting between rim 710 and hub 730. In some embodiments, members 740 support a fixed distance, under a compressive forces of less than a threshold magnitude, between hub 730 and contact regions (e.g., flanges 715) at rim 710. Optionally, members 740 do not maintain or only partially support circularity of rim 710, and therefore the latter is optionally provided strengthen with respect to previously shown rims. In some embodiments, hub 730 includes a center rounded portion 736 having a bore 738 passing therethrough and housing a bearing (not shown) mountable to a chassis (e.g., of a wheelchair) using an axle. Three outwardly radial extensions 734 originate from hub center 736; each radial extension 734 ends with an angularly extended head 732; each angularly extended head 732 includes two lateral sides; wherein each lateral side is hingedly connected to an inward connection portion 742 of a member 740. Member 740 includes an outward connection portion 746 which is hingedly connected to rim 710 at flange 715. Each member 740 includes a piston 741 slidably movable in a cylindrical housing 745. Both piston 741 and housing 745 includes linear slots (744 and 748, respectively) provided along and in parallel to their longitudinal axes, and each include a movable pin (743 and 747, respectively) that is slidably movable in a corresponding slot (pin 743 in slot 748 and pin 747 in slot 744). A preloaded compression spring 750 is provided connected in-between pin 743 and 747. Spring 750, when fully relaxed or compressed under a predetermined threshold value (according to preloading), maintains pins 743 and 747 at a normally fixed distance. When piston 741 and housing 745 are subject to compression or extension stresses that are over the predetermined threshold value, the pins ultimately move one towards the other thereby compressing spring 750. A damping member (not shown) may also be provided and configured to act in parallel to contraction motions of spring 750. Member 760 is an alternative design that can replace member 740, and while preserving similar qualities, it is based on gas spring 770 instead of coil spring 750. Similarly, when member 760 elongates or shortens at stresses exceeding the threshold value, gas spring 770 will be forced to compress. In some embodiments, gas spring 770 includes damping capabilities, as known in the art.

Within FIGS. 3 and 4A-C, a second preferred embodiment of a wheel connectable to a vehicle, particularly to a wheel chair, is shown. Wheel 10 comprises a rim 34 carrying a tire 36. The rim 34 is connected to a hub 38 by three supporting members 40. An axle 42 is shown provided in hub 38, being in this embodiment surrounded by bearing 44. The inner ring of the bearing 44 is fixed to the axle 42 and the outer ring of the bearing 44 is fixed to a connecting member 46 having three arms 48. The arms 48 are particularly arranged radially to the axle 42. The support members 40 are connected to the outer end portions of the arms 48 so that the support members 40 are not arranged in a radial manner in the wheel.

To damp a stroke or the like, the length of the support members 40 vary damping the stroke.

Within the drawings 4A-C, the support members 40 are shown in different damping situations.

In a regular, normal situation (i.e., hub 38 in concentric with rim 34), each of the support members 40 centralized and are not compressed or elongated, and a spring 50 provided therein is substantially preloaded (e.g., it is held compressed to a length being substantially smaller than its non-stressed length).

The support members comprise two longitudinal elements 52 and 54, whereby the cylindrical element 54 surrounds the inner cylindrical element 52. Therefore, it is possible to move the two longitudinal elements 52, 54, relative to each other in a longitudinal direction 56. Within the inner longitudinal element 52, the damper 50 is located. The spring 50 comprises a piston 58, being located within a cylinder 60. The cylinder 60 is, for example, filled with compressed gas or oil. Spring 50 is preloaded since at nominal position, the pins 62 are distanced such that the spring is already compressed to the threshold value. Only above the threshold it can be further compressed. The end portions of the spring 50, i. e. of the cylinder 60 and the rod 58, are each connected to a pin-like tracked sliding element 62. The pin-like tracked sliding elements are passing through slits 64 of the inner longitudinal element 52 and slits 66 of the outer longitudinal element 54. Due to the slits 64 and 66, a movement of the two longitudinal elements 52, 54 in longitudinal direction 56 is possible. Slits length provide boundaries to such relative motion, above which pins 62 are forced to move.

Figure 4A:
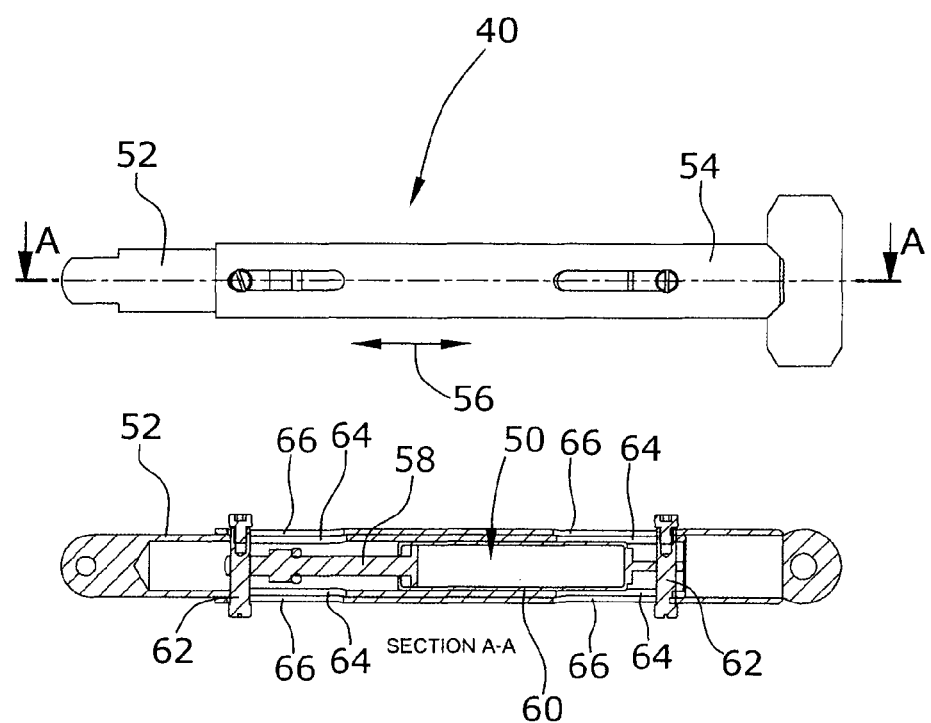
FIGS. 4A-C are showing side views of the spring element used within the wheel shown in FIG. 3 in different damping situations.
Figure 4B:
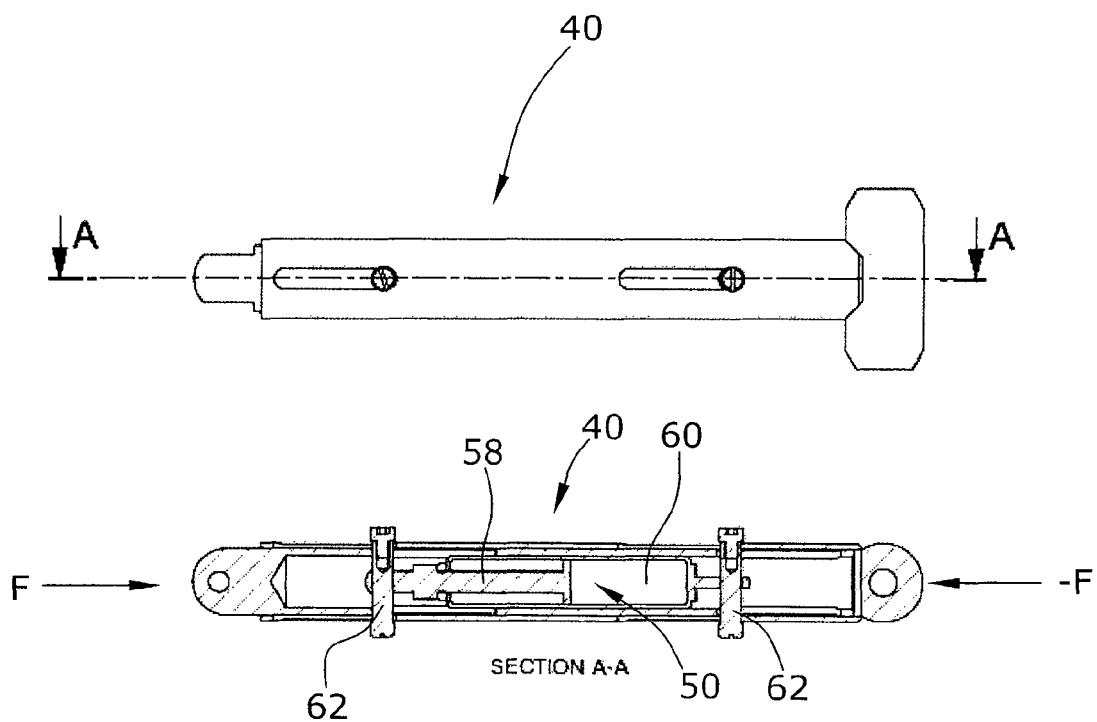

As shown in FIG. 4B, combined acting forces F and −F compress support member 40. The force actuates and compresses spring 50, due to the fact that rod 58 is pressed into the cylinder 60 compressing the air in the cylinder 60. Optionally and additionally, spring 50 acts as a damper so that some of the kinetic energy invested by the force work is dissipated and the stroke is absorbed. Additionally, the left tracked sliding element 62 is moved within left slits 64, 66. The right tracked sliding element 62 remains in place.

Figure 4C:
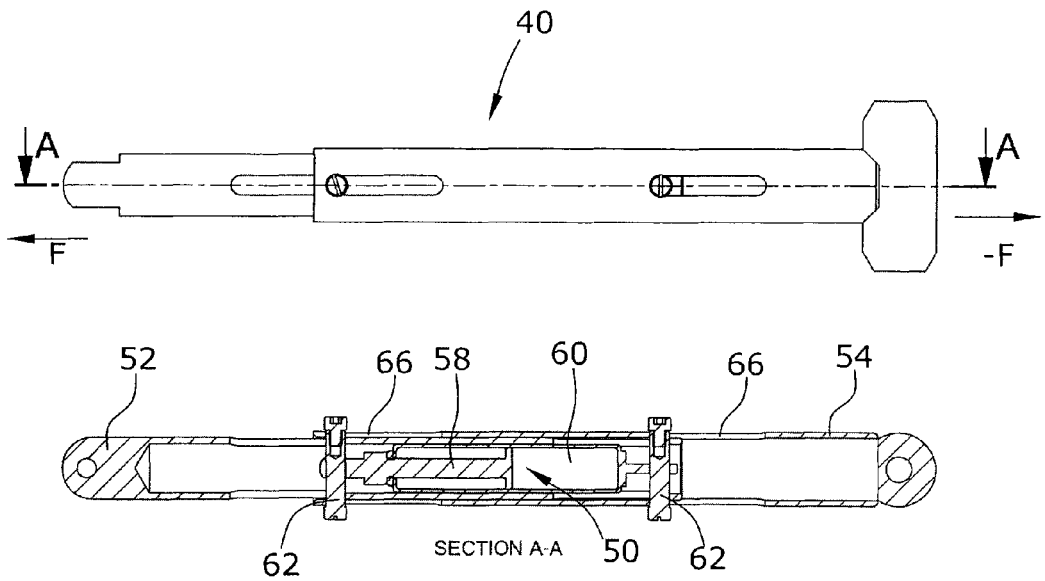

In some embodiments, when at least one support member in a self-suspended wheel or in a centralizing unit according to the present invention, there is at least a second support member being elongated, optionally at same extent, optionally to a different extent. In some such embodiments, springs and/or damper installed in both support members shall compress during the first support member compression and the second support member elongation, such that both springs and/or dampers contribute to the overall mechanical energy storage and/or damping, respectively. Reference is now made to FIG. 4C, showing that the support member 40 is now elongated by a force F. According to the invention, the spring 50 is compressed, i. e. the rod 58 is, for example, compressing gas provided in the cylinder 60, even if the support member 40 is elongated. This is possible due to the fact that in this case, the left tracked sliding element 62 is held in place compared to the normal position (FIG. 4A), whereby the right tracked sliding element 62 is moved to the left in FIG. 4C. This movement is possible since the right tracked sliding element 62 can be moved to the left inside the slit 66 of the outer longitudinal element 54, whereby this movement is caused by moving the inner longitudinal element 52 to the left in FIG. 4C.

A centralizing unit according to the invention may comprise a central member 48 being connected to three support members 40, whereby the central member 38 does not necessarily have to be connected to a hub and the support members 40 do not necessarily have to be connected to the rim (see, for example, FIG. 3).

The principle mechanism background of a bilateral spring mechanism is hereinafter described in view of FIGS. 5A-5C.

Virtually, an infinite spring, such as a coil spring, that adheres to the linear rule of elasticity, would demonstrate substantially the same ratio between elongation to required force as it would between compression to required force (often referred to as 'k', or spring constant).

Figure 5A:
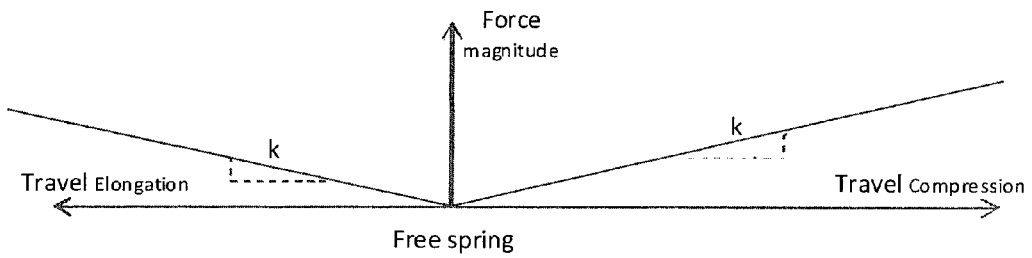
FIGS. 5A-C are showing diagrams of bilateral spring mechanisms.

Therefore, if such a spring is allowed to work both as a pulling spring and as a compression spring, its behavior as depicted in the graph of FIG. 5A.

Figure 5B:
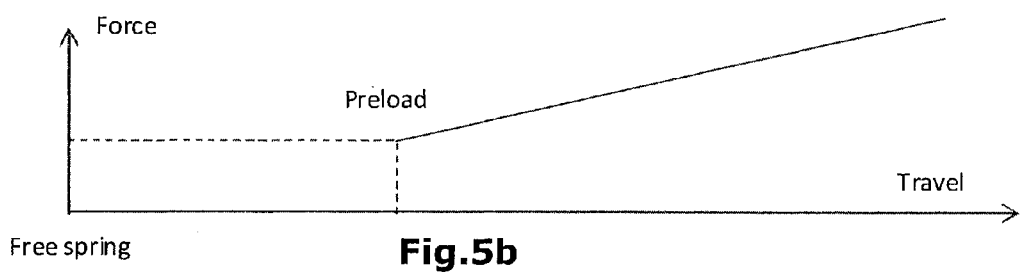

In most suspension systems the spring is installed with some portion of compression preload, in order to prevent the spring to be free at any point, hence diminishing unwanted movement of the spring while not under compression forces (see graph of FIG. 5B).

As a preloaded spring is inherently stressed in one direction (e.g., compressed), if it is prone also to shift to the opposite direction (e.g., extend) then the preloading function will not be efficient.

Therefore, while compressing the system for a certain travel (e.g., 2 cm) would require a certain amount of force, elongating the system by the same travel would require less force.

The disclosures provided herein allow bilateral suspension or centralizing unit and obviate the need for two such mechanisms (or sub-systems) to be installed in opposite directions, in order to for a mirrored image of the graph shown in FIG. 5B.

Figure 5C:
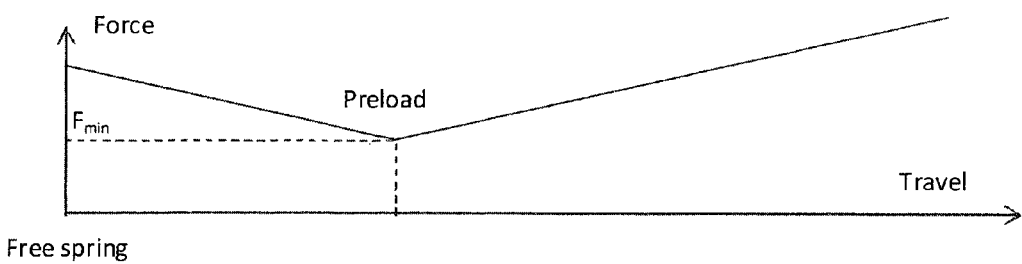

When a symmetrical preloaded springing system is implemented, both compression and elongation produce the same forces, in their respective direction, while allowing preloading function in both directions, as shown in FIG. 5C.

Such a "mirrored" springing system enables several benefits that are impossible with one-directional springs, like a bi-directional threshold and symmetrical suspension response using a single sprung element while other applications that deals with cyclic or periodic perturbations must use two systems installed in opposite directions.

The principal of a bi-directional threshold can be described as preventing motion in any direction, as long as force above a certain magnitude, like $F_{min}$, is not exerted on the system. In this setup, any force, in any direction, that is lower than $F_{min}$ will not derive any movement of the spring, and only forces higher than $F_{min}$ will cause the spring to travel at k ratio, in either direction (without any special push/pull connection).

The invention claimed is:

1. A centralizing unit comprising a suspension system with at least one support member comprising:
   an outer longitudinal element enclosing a lumen, comprising a first outer slit and a second outer slit longitudinally spaced from said first outer slit along an outer slit longitudinal axis;
   an inner longitudinal element slidable in said lumen, comprising a first inner slit and a second inner slit longitudinally spaced from said first inner slit along an inner slit longitudinal axis, said inner and outer longitudinal elements are slidably movable relative to each other in a longitudinal direction within said lumen;
   a first sliding pin provided in said first outer slit and said first inner slit;
   a second sliding pin provided in said second outer slit and said second inner slit; and
   a suspension spring connected with a first end to said first sliding pin and with a second end to said second sliding pin;
   wherein said inner and outer longitudinal elements are configured whereby when subjected to compression or extension stresses less than a predetermined threshold value, said first and second sliding pins maintain a fixed distance relative to each other.

2. The centralizing unit of claim 1, wherein said slits are sized and arranged wherein at a central relative position between said outer longitudinal element and said inner longitudinal element, said first sliding pin and said second sliding pin are pushed by said suspension spring to a maximal distance.

3. The centralizing unit of claim 2, wherein, when said first sliding pin and said second sliding pin are at said maximal distance, said suspension spring is at a nominal length being smaller than a non-stressed length of said suspension spring.

4. The centralizing unit of claim 1, wherein at any non-central relative position between said outer longitudinal element and said inner longitudinal element, said first sliding pin and said second sliding pin are forced to approach each other to a distance smaller than said maximal distance, thereby compressing said suspension spring between said first sliding pin and said second sliding pin.

5. The centralizing unit of claim 1, comprising a central member connected at a first portion to a first of said at least one support member, and at an evenly displaced second portion to a second of said at least one support member substantially identical to said first support member.

6. The centralizing unit of claim 5, wherein, when said central member is loaded to a magnitude greater than a predetermined threshold value, said first support member elongates and said second support member compresses, whereby both of a first spring element of said first support member and a second spring element of said second support member compress with a cumulative compression force resisting said loaded magnitude of said central member.

7. The centralizing unit of claim 6, wherein, when said central member is loaded to a magnitude less than said predetermined threshold value, said first and second support members support a fixed distance between said central member and said first and second support members.

8. The centralizing unit of claim 6, wherein, when said central member is loaded to a magnitude less than a predetermined threshold value, said inner and outer longitudinal elements are configured to support a fixed distance between said central member and said support member.

9. The centralizing unit of claim 1, wherein said suspension spring dissipates kinetic energy at least partly upon compression of said suspension spring.

10. The centralizing unit of claim 1, configured to dissipate kinetic energy at least partly upon compression of said first spring element and of said second spring element.

11. The centralizing unit of claim 1, wherein said first sliding pin passes through said first inner and outer slits, and said second sliding pin passes through said second inner and outer slits, during said relative slidable movement of said inner and outer longitudinal elements.

12. The centralizing unit of claim 1, wherein said inner and outer longitudinal elements are configured whereby when subjected to compression or extension stresses over a predetermined threshold value, said first and second sliding pins move towards each other, thereby compressing said suspension spring.

13. The centralizing unit of claim 12, wherein said suspension spring stores mechanical energy at compression, and is provided preloaded to a predetermined threshold value, thereby compresses only in response to compressive force greater than said threshold value.

14. The centralizing unit of claim 1, wherein said suspension system is provided in a wheel including a hub and a rim, and being connectable to a vehicle, wherein said at least one support member is positioned between said hub and said rim, thereby providing a normally fixed distance between said hub and said rim.

15. The centralizing unit of claim 14, wherein said at least one support member is connected in a non-radial manner to said hub.

16. The centralizing unit of claim 14, wherein said support member is adapted to retain said distance when stressed up to a threshold value and to recoverably alter said distance when stressed over said threshold value.

17. The centralizing unit of claim 16, wherein said threshold value relates to a minimal shock magnitude absorbed by said wheel.

18. The centralizing unit of claim 16, wherein said threshold value relates to a minimal vibration amplitude absorbed by said wheel.

* * * * *